United States Patent [19]

Beckman

[11] Patent Number: 5,700,033
[45] Date of Patent: Dec. 23, 1997

[54] REMOVABLE CROSS MEMBER FOR VEHICLE FRAME

[75] Inventor: John A. Beckman, Wernersville, Pa.

[73] Assignee: Dana Corporation, Toledo, Ohio

[21] Appl. No.: 657,879

[22] Filed: May 31, 1996

[51] Int. Cl.⁶ .................................................. B62D 21/00
[52] U.S. Cl. .................................. 280/795; 280/787
[58] Field of Search ............................. 280/787, 793, 280/794, 795, 796

[56] References Cited

U.S. PATENT DOCUMENTS

| | | | |
|---|---|---|---|
| 1,243,255 | 10/1917 | Campbell | 280/794 |
| 1,440,837 | 1/1923 | Murphy . | |
| 1,928,942 | 10/1933 | Maddock | 280/794 |
| 2,113,403 | 4/1938 | Harmon | 280/796 |
| 2,113,540 | 4/1938 | Maddock | 280/794 |
| 2,759,740 | 8/1956 | McFarland . | |
| 3,163,251 | 12/1964 | Rees | 280/794 |

Primary Examiner—Kenneth R. Rice
Attorney, Agent, or Firm—MacMillan, Sobanski & Todd

[57] ABSTRACT

A full perimeter vehicle frame is described having two siderails and at least one cross member having a zigzag shape which allows it to be easily removable from the siderails. The removable cross member can be square or tubular in cross section and is configured having a first end and a second end which are parallel, but offset from each other and a central portion which extends at an angle between the first end and the second end. The siderails each have an aperture which extends through the siderail from an inner side to an outer side of each siderail. One of the apertures is located at an axial position on a siderail which is offset from the other aperture located on the other siderail. These two apertures are offset the same axial distance as the amount of distance the first and second ends of the cross member are offset from one another. In this configuration, the first end of the cross member is positioned in one of the apertures located in one of the siderails while the second end is positioned in the other aperture located in the other siderail. The cross member is easily installed by positioning one end of the cross member in an aperture in one of the siderails while the other end is positioned to lie in a plane above or below the other siderail. By laterally moving the inserted end, the free end can be rotated towards its associated siderail, and the free end of the cross member can be inserted into the aperture in that siderail. The reverse actions are taken to remove the cross member from the siderails.

8 Claims, 3 Drawing Sheets

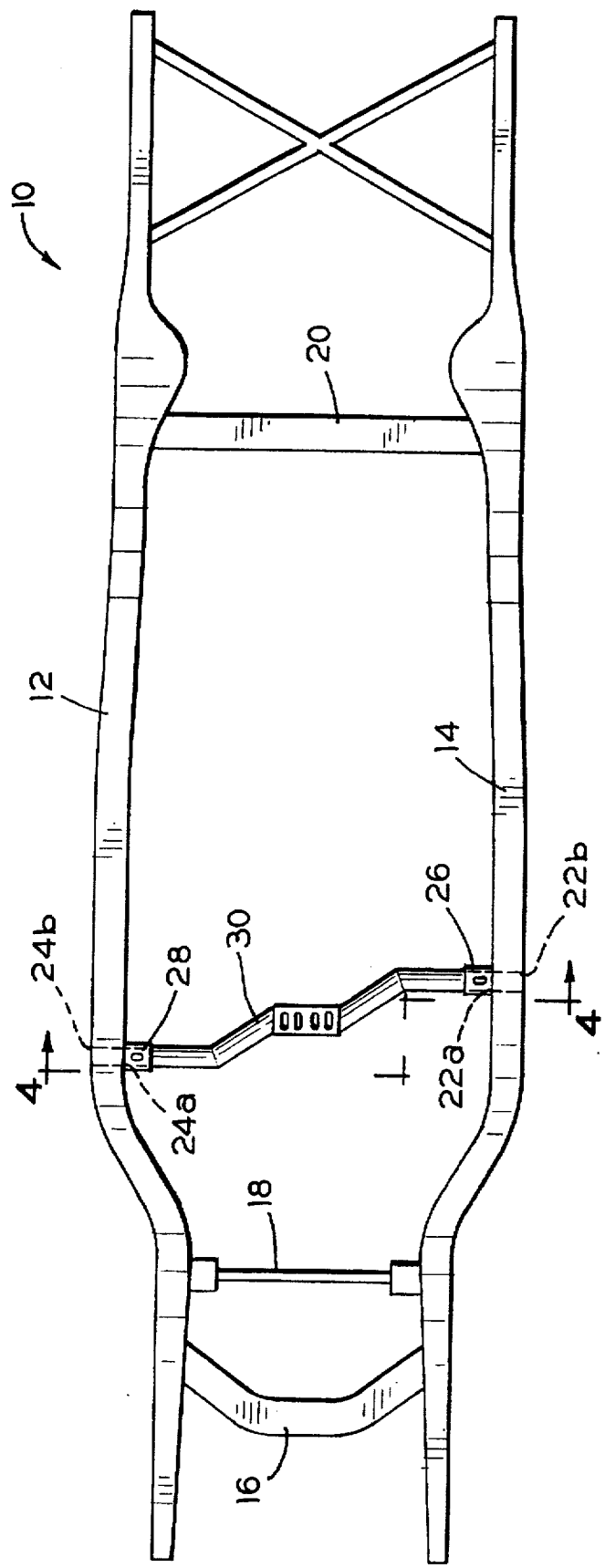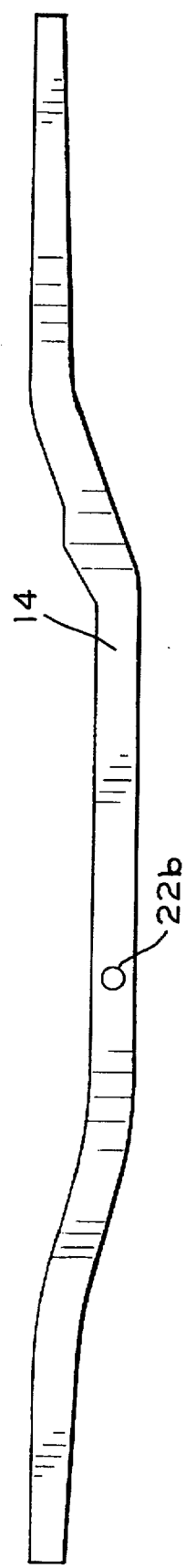

REMOVABLE CROSS MEMBER FOR VEHICLE FRAME

BACKGROUND OF THE INVENTION

This invention relates in general to frame assemblies for vehicles. More specifically, this invention relates to a cross member for a full perimeter vehicle frame assembly which is easily removable to facilitate access to vehicular components carried thereon and which increases the lateral and torsional stiffness of the vehicle frame assembly.

Virtually all land vehicles in common use, such as automobiles and trucks, include a frame which serves as a platform upon which the remainder of the vehicle is built. Many vehicle frame structures are known in the art. Most of these known vehicle frame structures are formed from a number of individual metallic components which are permanently joined together. For example, a typical perimeter vehicle frame assembly is composed of a pair of longitudinally extending side rails which are joined together at the front by a forward cross member, at the rear by a rearward cross member, and at intermediate locations by one or more intermediate or auxiliary cross members. The cross members not only connect the two side rails together, but also provide desirable lateral and torsional rigidity to the vehicle frame assembly. In some vehicle frame assemblies, the side rails are formed from open channel structural members, i.e., structural members which have a non-continuous cross sectional shape (C-shaped channel members, for example). In other vehicle frame assemblies, the side rails are formed from closed channel structural members, i.e., structural members which have a continuous cross sectional shape (box-shaped channel members, for example). Regardless of the specific structure of the structural members, the side rails and cross members, once joined together, form a rigid frame for supporting the remaining portions of the vehicle thereon.

Typically, the cross members extend transversely relative to the two parallel side rails, and the ends of the cross members are permanently secured to the side rails to form a generally rectangular vehicle frame assembly. The cross members are usually secured to the side rails by initially welding brackets to the side rails, then connecting the ends of the cross rails to the brackets by bolts or rivets. Once the vehicle frame assembly is completed, the remaining components of the vehicle, including the body, drive train, and suspension, can be mounted thereon in a known manner.

As mentioned above, the cross members are permanently secured to the side rails to form the vehicle frame assembly. While such a structure is relatively simple and inexpensive to manufacture, it has been to be inconvenient in certain circumstances. Specifically, in some vehicle frame assemblies, one or more of the cross members have been found to obstruct clear access to certain components of the vehicle which are caried on the frame assembly. Such access is occasionally necessary to service or replace these components. Thus, it would be desirable to provide an improved structure for a vehicle frame assembly which includes one or more cross members which are removable to gain access to the components of the vehicle caried thereon. It would also be desirable to provide such a removable cross member for a vehicle frame assembly which increases the lateral and torsional stiffness of a vehicle frame assembly having side rails formed from closed channel structural members.

SUMMARY OF THE INVENTION

This invention relates to a full perimeter vehicle frame having box-shaped siderails and at least one cross member having a zigzag shape which allows it to be easily removable from the siderails. The removable cross member includes a first end and a second end which are parallel, but offset from each other, and a central portion which extends at an angle between the first end and the second end. The central portion of the cross member may include a center section disposed between two angled sections. The box-shaped siderails each have an aperture which extends through the siderail from an inner side to an outer side of each siderail. One of the apertures is located at an axial position on a siderail which is offset from the other aperture located on the other siderail. These two apertures are offset the same axial distance as the amount of distance the first and second ends of the cross member are offset from one another. In this configuration, the first end of the cross member is positioned in the aperture located in the first siderail, while the second end is positioned in the other aperture located in the second siderail. Thus, the first end is attached to the first siderail at an axial position which is offset from the axial position at which the second end of the cross member is attached to the second siderail. Optionally, a cross member-to-siderail fixment, which may take the form of a rectilinear or tubular hollow mounting bracket, may be secured to each siderail and disposed around the apertures located in each siderail for supporting and securing the cross member in place.

The cross member is easily installed by initially positioning the first end of the cross member in the aperture in the first siderail while orienting the second end to lie in a plane above or below the second siderail. The first end is then moved in a first direction such that the first end extends beyond the first siderail. The second end of the siderail can then be rotated upward or downward toward the second siderail so as to become aligned with the aperture located in the second siderail, and inserted into the aperture. The cross member is then moved in a second direction opposite the first direction so as to become centered between the two siderails. Lastly, the ends of the cross member are secured to the siderails. The cross member can be removed from the vehicle frame by following the installation steps in reverse order.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a top view of a vehicle frame showing a removable auxiliary cross member in accordance with the present invention.

FIG. 2 is a side elevational view of the vehicle frame shown in FIG. 1.

DETAILED DESCRIPTION OF THE PREFERRED EMBODIMENT

Figure 3:
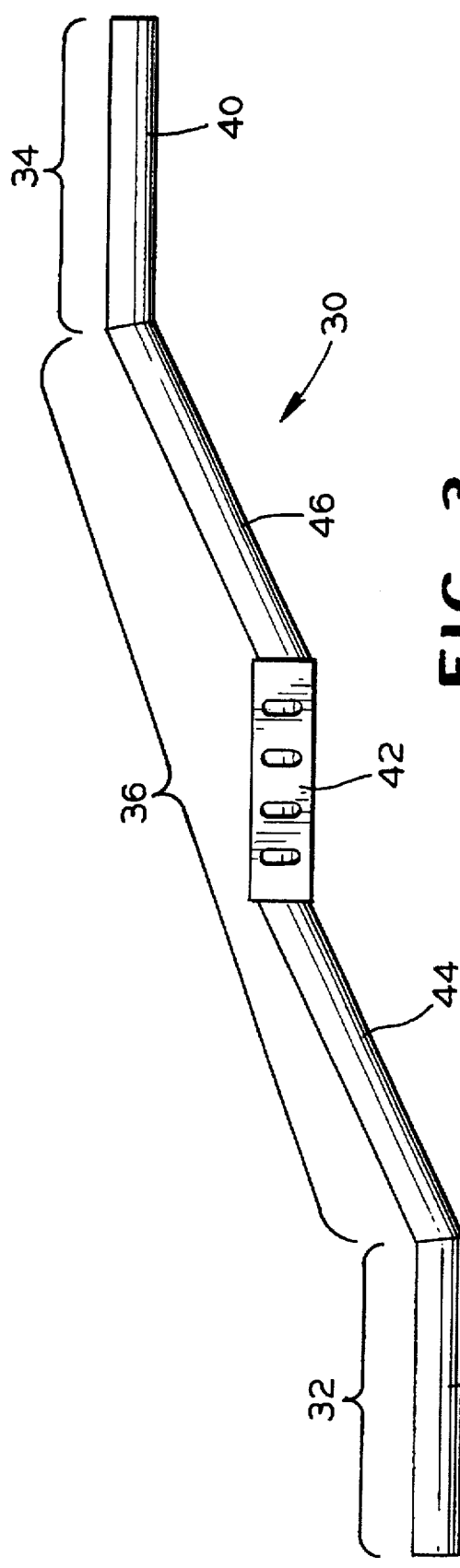
FIG. 3 is an enlarged top view of the cross member shown in FIG. 1.

Referring now to the drawings, there is illustrated in FIG. 1 a full perimeter frame, indicated generally at 10 in accordance with the present invention. The perimeter frame 10 includes two siderails 12 and 14, a front cross member 16 and a rear cross member (not shown) which together form a generally rectilinear shape. The siderails 12 and 14 extend axially and generally parallel with respect to each other. For the sake of clarity, the terms "axially", "laterally", "inner" and "outer" refer to the orientation of the vehicle as a whole. Therefore, the term "axial" and its derivatives imply a direction which extends along the length of the vehicle from the front of the vehicle to the rear of the vehicle. Similarly, the term "lateral" and its derivatives as used herein refer to a direction which extends from side to side of the vehicle. In addition, the terms "inner" and "outer" refer to components located inside the full perimeter frame and outside of the full perimeter frame respectively. However, it will be appreciated that these terms are relative only, and that it is contemplated that this invention can relate to other vehicle frame structures.

Figure 4:
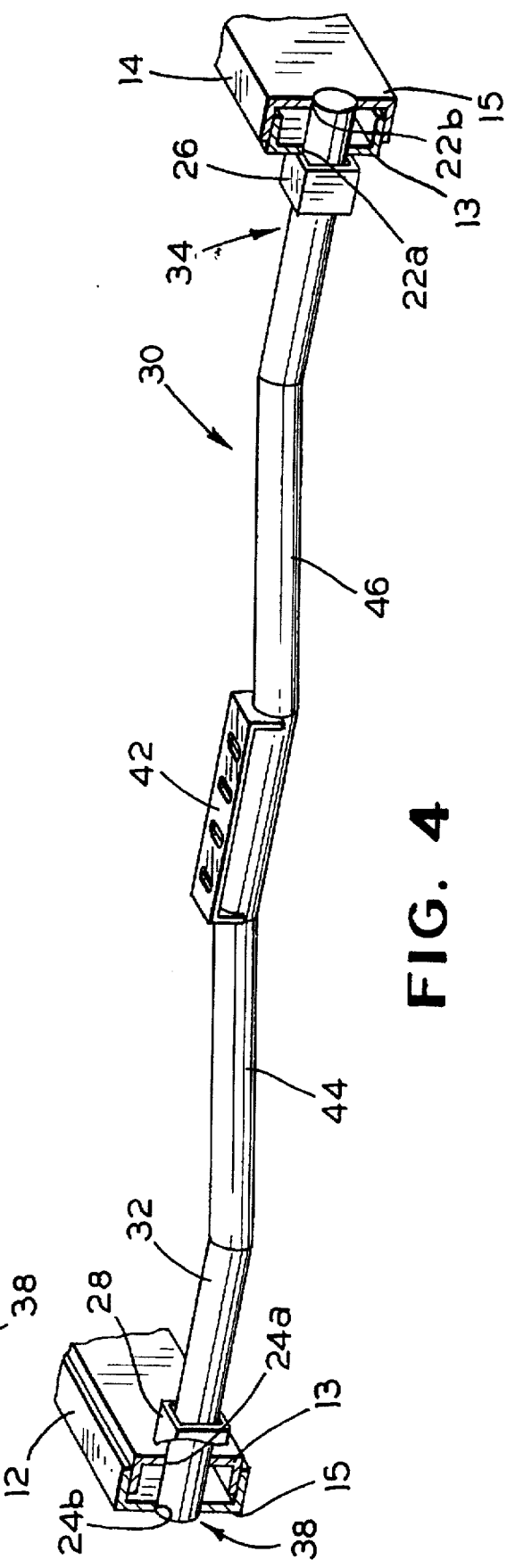
FIG. 4 is a perspective view of the cross member and portions of the siderails of the vehicle frame shown in FIG. 1, wherein the cross member is shown in an installed condition.
Figure 5:
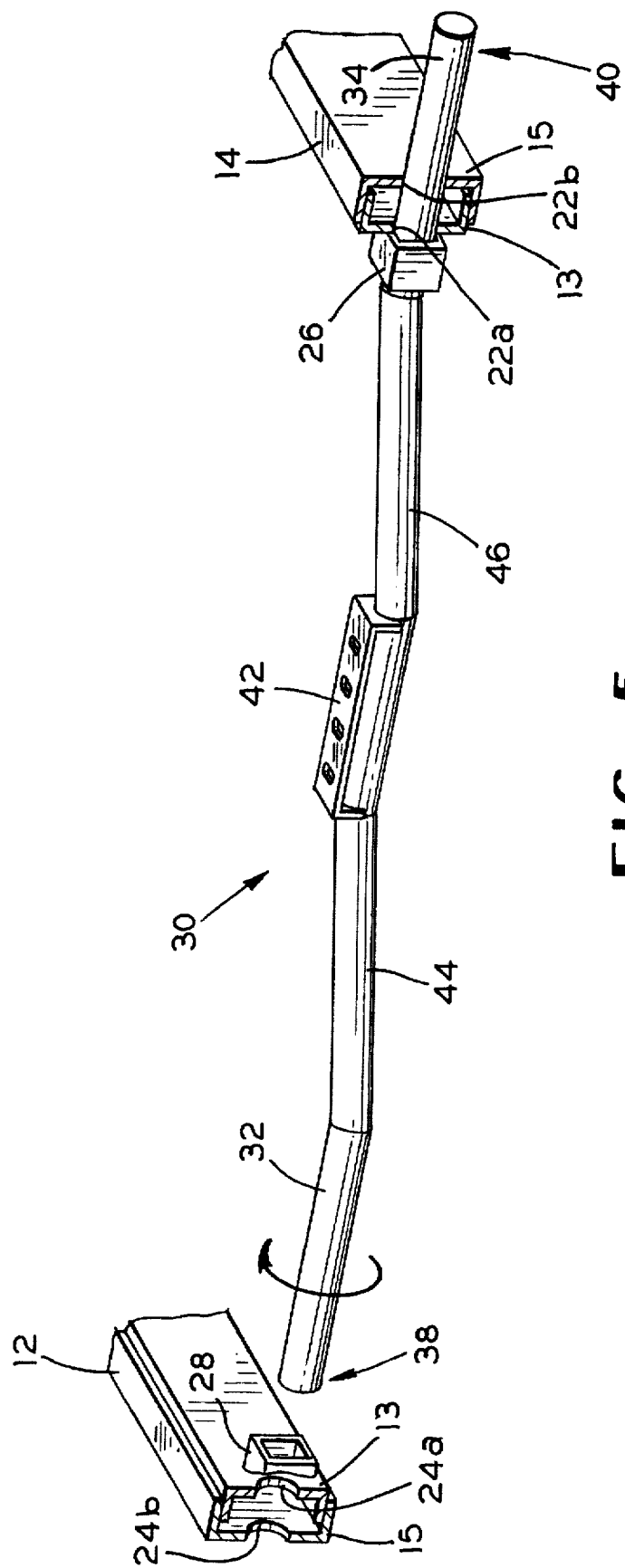
FIG. 5 is a perspective view similar to FIG. 4, wherein the cross member is shown in a partially removed condition.

The siderails 12 and 14 can be made as a single member which extends the whole axial length of the vehicle. Alternatively, they can be formed from two or more pieces which are overlapped and then bolted, welded, riveted, or otherwise secured together to form the desired siderail. For either the single member or overlapped-members type of siderail, the siderails 12 and 14 can be made from two pieces of generally C-shaped stock which are overlapped, either vertically or horizontally, and then secured together to form a box-shaped structure having four walls and a hollow center as shown in FIGS. 4 and 5. As seen in these figures, the two C-shaped members for each siderail 12 and 14 are assembled together vertically such that one of the members 13 is on the inside of the frame 10 while the other 15 is on the outside of the frame. Typically, they are assembled so that the outer C-shaped member 15 overlaps the inner C-shaped member 13 as shown for siderail 12 in FIG. 4. Alternatively, they may be assembled such that the inner C-shaped member 13 overlaps the outer C-shaped member 15 as shown for siderail 14 in FIG. 4. Preferably, both siderails 12 and 14 are assembled in one configuration or the other (i.e. where the outer member 15 overlaps the inner member 13 for both siderails or where the inner member 13 overlaps the outer member 15 for both siderails). The siderails 12 and 14 can also be made from box-shaped stock. Typically, steel stock is used for either the C-shaped and unitary box-shaped members. Other suitable materials for the siderails include, but are not limited to, aluminum, plastics, composites (such as fiber matrix composites), or combinations thereof.

The illustrated front cross member 16 and the rear cross member (not shown), are bolted, welded, riveted, or otherwise secured to the siderails 12 and 14 so as to provide lateral and torsional rigidity to the siderails. Often, additional or auxiliary cross members are included for increased rigidity or to support specific vehicle components such as a front differential assembly in a vehicle having four wheel drive. Several of these auxiliary cross members are shown in FIG. 1 at 18, 20 and 30. In general, all of the cross members extend in a generally perpendicular, lateral direction with respect to the siderails 12 and 14 and in a spaced parallel relationship with respect to one another.

Typically, the cross members are designed as generally linear members which are attached to the siderails 12 and 14 at points located at the same axial position but directly opposite each other on the siderails 12 and 14. Examples of this type of cross member include cross members 18 and 20 in FIG. 1. Typically, the cross members are secured to the siderails 12 and 14 by attaching the cross members to external brackets mounted to the inner C-shaped member 13 of siderails 12 and 14. This method of attachment usually results in placing more stress on the inner C-shaped member 13 than on the outer member 15. Ideally, it is desirable to more evenly distribute the stresses imposed on the frame 10 between the inner member 13 and outer member 15 of the siderails 12 and 14.

As shown in FIGS. 1 and 4, a first end 32 of the cross member 30 extends through an aperture 24a formed through the inner member 13 and through an aperture 24b formed through the outer member 15 of siderail 12. Similarly, a second end 34 of cross member 30 extends through an aperture 22a formed through the inner member 13 and through an aperture 22b formed through the outer member 15 of siderail 14. Alternatively, apertures 24 and 22 could extend through only the inner member 13 of siderails 12 and 14, respectively. However, this configuration is not as effective in uniformly distributing stresses through the siderails 12 and 14. In the preferred embodiment, the ends of cross member 30 can be extended beyond either siderail 12 or 14. Lateral movement of cross member 30 may be prevented by cross member-to-siderail fixments 26 and 28 which are secured to siderails 14 and 12, respectively. In general, a number of types of cross member-to-siderail fixments 26 and 28 may be used with this invention including, but not limited to, generally rectilinear or tubular brackets which at mounted on the inner member 13 of the siderails 12 and 14. In general, the cross member-to-siderail fixments 28 and 26 may be hollow structures which are mounted or otherwise disposed around the apertures 24a in siderail 12 and aperture 22a in siderail 14 such that the open end of each fixment 28 and 26 aligns with the apertures 24a and 22a, respectively. The cross member-to-siderail fixments 28 and 26, therefore, extend in a generally perpendicular direction from the siderails 12 and 14 respectively. In addition, the cross member-to-siderail fixments 28 and 26 may be configured to either fully or partially enclose the ends of the cross member 30. In general, the type and configuration of the cross member-to-siderail fixments 26 or 28 used will be dependent on the configuration of the cross member 30, as will be discussed below. The cross member 30 may be bolted, welded, riveted, or otherwise secured to the cross member-to-siderail fixments 26 and 28 such that the cross member 30 cannot move relative to the siderails 12 or 14. In a preferred embodiment of the invention, the cross member 30 is secured to the fixments 26 and 28 by bolts, rivets or other fastening devices which can be easily removed so as to facilitate removal of the cross member 30.

Generally, once a full perimeter frame 10, including all of the cross members, is assembled and the various components of the vehicle are attached to the frame 10, it is usually not necessary to remove any of the cross members. However, if any of the larger components, such as the engine or transmission require maintenance and/or replacement, it may be necessary to remove one or more of the cross members. The cross member 30 is typically used for supporting the transmission. Therefore, it is desirable to be able to easily remove cross member 30 whenever maintenance on the transmission or other nearby components is necessary. One manner in which removal and installation can be facilitated is to form the cross member 30 in a non-linear shape which is characterized by having one end of the cross member 30 offset from the other end of the cross member 30. This configuration is best shown in FIGS. 1, 3, and 4. While cross member 30 is the only cross member illustrated as having this particular configuration in the drawings, it should be appreciated that this invention can be equally applied to any other cross member, including the front and rear cross members.

Referring to FIG. 3, the cross member 30 in accordance with the present invention is a generally non-linear member which can be constructed from tube or square stock and formed into the desired shaped. Typically, steel stock is used for the cross member 30. However, other suitable materials include, but are not limited to, aluminum, plastics, composites (such as fiber matrix composites) or combinations thereof. The cross member 30 may be formed into the desired shape using any of the known deformation methods including, but not limited to, mechanical bending, stamping, die casting, or hydroforming. In a preferred embodiment, the cross member 30 is configured to include a first end 32, a second end 34 which is parallel to and offset from the first end 32, and a central portion 36 which generally extends at an angle between the first end 32 and the second end 34. As shown in FIG. 3, the central portion 36 may include a center section 42 disposed between a first angled section 44 and a second angled section 46. By offsetting the first end 32 from the second end 34, the cross member 30 can be rotated to a position where one of the ends 32 lies in a higher vertical plane than the other end 34. This aspect is significant for installation and removal of the cross member 30, as will be discussed below.

The first end 32 has an end portion 38 which extends through apertures 24a and 24b in siderail 12, as shown in FIG. 4. Similarly, the second end 34 has an end portion 40 which extends through apertures 22a and 22b in siderail 14. Thus, the end portion 38 of the first end 32 extends beyond the siderail 12 when the cross member 30 is inserted into aperture 24a and 24b and moved laterally in one direction towards the left in FIGS. 4 and 5. Similarly, the end portion 40 of the second end 34 extends beyond the siderail 14 when the cross member 30 is inserted into apertures 2422a and 22b and moved laterally in an opposite direction towards the fight in FIG. 4 and 5. Typically, the cross member 30 is only be moved laterally in this manner to facilitate its installation and removal, as will be discussed below. Normally, the cross member 30 is fixed in a lateral position by welds, bolts, rivets or any other suitable fastening devices which secure cross member 30 to cross member-to-siderail fixments 26 and 24.

To install the cross member 30, the cross member 30 is initially is positioned such that the first end 32 is aligned with the open end of fixment 28 secured to siderail 12, while the second end 34 is oriented to lie in a plane which is above the siderail 14. Next, the end portion 38 of the first end 32 is inserted into the fixment 28 and into apertures 24a and 24b located in siderail 12. The cross member 30 is then moved laterally in a first direction for a sufficient distance such that the second end 34 can be aligned with fixment 26 when it is rotated towards siderail 14. The cross member 30 is then rotated downward such that the end portion 40 of the second end 34 is aligned with fixment 26. Finally, the cross member 30 is moved laterally in a second direction such that end portion 40 of the second end 34 is inserted into fixment 26 and apertures 22a and 22b. Once the cross member 30 is installed in both fixments 28 and 26 and centered in apertures 24a, 24b, 22a, and 22b, it may be secured to fixments 28 and 26 using suitable fastening devices, such as bolts or rivets. The installation process can alternatively be performed by first installing the second end 34 of the cross member 30 into siderail 14, and then installing the first end 32 into siderail 12. In addition, the installation process can alternatively be performed by initially rotating the second end 34 of the cross member 30 downward such that the second end 34 lies in a vertical plane below the siderail 14 and then rotating the second end 34 upward after the first end 32 has been aligned in its aperture 24.

The removal process is performed by reversing the above actions. In summary, the reverse actions include removing the bolts or other fastening devices from the fixments 26 and 28 and cross member 30; moving cross member 30 laterally in one direction to free either its first end 32 from fixment 28 or its second end 34 from fixment 26; rotating the free end 32 or 34 of the cross member 30 above or below its associated siderail 12 or 14 such that cross member 30 is now able to be laterally moved in the opposite direction it was first moved in; and moving cross member 30 in that opposite direction so as to free it from the remaining fixment 26 or 28.

As described above, the cross member 30 more evenly distributes the stresses imposed on the frame 10 between the inner member 13 and the outer member 15 of the siderails 12 and 14. More specifically, by positioning the cross members in apertures 24a, 24b, 22a, and 22b in siderails 12 and 14, respectively, both the inner member 13 and the outer member 15 of the siderails 12 and 14 directly support the cross member. Additionally, the cross member-to-siderail fixments 28 and 26 may be attached to each siderail 12 and 14, respectively, and used in conjunction with the apertures to both support and to secure the cross member in a lateral position.

While this invention has been described for use in a full perimeter type of vehicle frame, the invention may also be practiced with any type of frame that uses siderails. For example, many of the unitized frame structures similarly use box-shaped siderails built into the body of the vehicle. Accordingly, an auxiliary cross member 30 having offset ends and an angled central portion could be similarly positioned and secured in offset apertures located in the unitized frame siderails. In addition, the inventive auxiliary cross member 30 could also be used in a cradle type of frame. A cradle type of frame may also utilize box-shaped siderails which extend for only a short length of the vehicle, typically for supporting the drive train of the vehicle. The installation and removal processes of the inventive auxiliary cross member would involve the same steps regardless of the type of frame utilized.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A frame for a vehicle comprising:

a first siderail and a second siderail, said first siderail and second siderail extending axially with respect to the length of the vehicle and generally parallel with respect to each other, each of said first siderail and said second siderail having an aperture which extends therethrough from an inner side of each siderail to an outer side of each siderail, said first siderail aperture being located at an axial position which is offset from said second siderail aperture;

at least one cross member, said cross member extending in a generally perpendicular direction between said first and second siderails and being secured to said siderails; and an auxiliary cross member having a first end and a second end which are parallel, but offset from each other, and a central portion which extends at an angle between said first end and said second end, said first end being positioned in said first siderail aperture and said second end being positioned in said second siderail aperture such that said auxiliary cross member extends between said first siderail and said second siderail.

2. The vehicle frame defined in claim 1 further including a first cross member-to-siderail fixment secured to said first siderail and disposed around said first siderail aperture, a second cross member-to-siderail fixment secured to said second siderail and disposed around said second siderail aperture, and means for securing said auxiliary cross member to said first cross member-to-siderail fixment and second cross member-to-siderail fixment.

3. The vehicle frame defined in claim 2 wherein said means for securing said auxiliary cross member to said first cross member-to-siderail fixment and second cross member-to-siderail fixment is selected from the group consisting of bolts, rivets, and welds.

4. The vehicle frame defined in claim 3 wherein said means for securing said auxiliary cross member to said first cross member-to-siderail fixment and said second cross member-to-siderail fixment is comprised of bolts or rivets.

5. The vehicle frame defined in claim 1 wherein said central portion of said auxiliary cross member is comprised of a center section disposed between a first angled section and a second angled section, said first angled section and said second angled section extending generally parallel with respect to each other.

6. The vehicle frame defined in claim 2 wherein said first cross member-to-siderail fixment and said second cross member-to-siderail fixment is a generally hollow member which essentially fully surrounds said auxiliary cross member.

7. The vehicle frame defined in claim 1 wherein said first siderail and said second siderail are each comprised of an inner C-shaped member and an outer C-shaped member which are overlapped in a vertical direction to form said box-shaped first siderail and second siderail.

8. A method of installing an auxiliary cross member to a vehicle frame, said vehicle frame being comprised of a first siderail, a second siderail, and at least one cross member, said first and second siderails extending axially with respect to the length of the vehicle and generally parallel with respect to each other, said cross member extending in a generally perpendicular direction between said first and second siderails and secured to said first and second siderails, said method comprising the steps of:

(a) providing a first aperture which extends from an inner side of said first siderail to an outer side of said first siderail and providing a second aperture which extends from an inner side of said second siderail to an outer side of said second siderail, said first siderail aperture being located at an axial position which is offset from said second siderail aperture;

(b) providing an auxiliary cross member having a first end and a second end which are parallel, but offset from each other, and a central portion which extends at an angle between said first end and said second end;

(c) positioning said auxiliary cross member such that said first end of said cross member is aligned with said first siderail aperture and said second end of said cross member lies in a plane above or below said second siderail;

(d) moving said first end of said cross member into said first siderail aperture a sufficient distance until said second end of said cross member is able to be aligned with said second siderail aperture when it is rotated towards said second siderail;

(e) rotating said cross member in a direction towards said second siderail until said second end of said cross member is aligned with said second siderail aperture;

(f) moving said second end of said cross member into said second siderail aperture until said cross member is centered between said first and second siderails; and (g) securing said cross member to said first and second siderails.

* * * * *